United States Patent [19]

Fukushi

[11] Patent Number: 4,564,792
[45] Date of Patent: Jan. 14, 1986

[54] DOCUMENT FEEDER

[75] Inventor: Yukihiro Fukushi, Yokohama, Japan

[73] Assignee: Tokyo Shibaura Denki Kabushiki Kaisha, Kawasaki, Japan

[21] Appl. No.: 563,443

[22] Filed: Dec. 20, 1983

[30] Foreign Application Priority Data

Dec. 22, 1982 [JP] Japan ................................ 57-225223

[51] Int. Cl.⁴ .......................................... H02K 29/02
[52] U.S. Cl. ................................. 318/254; 355/3 SH; 318/138
[58] Field of Search .............. 355/3 SH; 318/138, 254, 318/439

[56] References Cited

U.S. PATENT DOCUMENTS 4,422,751 12/1983 Komiya et al. ................... 355/3 SH
4,427,287 1/1984 Matsumoto et al. ............. 355/3 SH
4,460,269 7/1984 Yamazaki et al. ................ 355/3 SH

FOREIGN PATENT DOCUMENTS

0012619 6/1980 European Pat. Off. .
0028077 5/1981 European Pat. Off. .
0050960 5/1982 European Pat. Off. .
2017972 10/1979 United Kingdom .
2064897 6/1981 United Kingdom .
2108725 5/1983 United Kingdom .

Primary Examiner—William M. Shoop, Jr.
Assistant Examiner—Bentsu Ro
Attorney, Agent, or Firm—Cushman, Darby & Cushman

[57] ABSTRACT

A document feeder, which is swingably arranged on a copying machine, which senses the position of the document on the copying table of the machine. When the document has travelled a predetermined distance, as monitored by a plurality of Hall effect sensors arranged on the motor which operates the document feeder, the motion of the document is terminated and the copying sequence begun. A special control circuit calculates the distance that the document has moved in response to the signals received from Hall sensors arranged at half slot intervals on the motor. The motion of the document is thereby stopped when it has moved a predetermined distance.

10 Claims, 12 Drawing Figures

DOCUMENT FEEDER

BACKGROUND OF THE INVENTION

The present invention relates to a document feeder employed in image forming equipment, such as copying machines.

Conventional copying machines are provided with a document feeder which serves to automatically feed documents to the document table. The document feeder has a transfer belt stretched between two rollers, one of which rollers is rotated by a motor, to enable the transfer belt to carry the documents to the document table. The conventional document feeder employs a commutator motor and induction motor as its drive motor, with the transfer distance of a document determined by the driving time of the motor. More specifically, when the document is set on the document feeder and the motor begins to rotate, a timer is actuated; and, once a preset period of time has elapsed, the motor is stopped. The document is then located at a predetermined position on the document table. However, the load applied to the document feeder when the document is transferred changes according to the thickness, quality and other characteristics of the document, thereby changing the load applied to the motor. The commutator motor and induction motor can hardly adapt to this load change, and is thus likely to vary the number of its rotations, in response thereto. In this case, the document is not so transferred, according to the present time of the timer, as to correctly locate the document on the document table.

SUMMARY OF THE INVENTION

An object of the present invention is to provide a document feeder for use in an image forming apparatus, which is capable of transferring documents to the correct position on the document table.

According to the present invention, a document feeder comprises a brushless motor, a drive circuit for generating an excitation phase exchanging signal which is applied to excitation windings of the brushless motor, and a circuit for detecting the signal of said drive circuit and measuring the transfer distance of a document in response to the signal detected.

DETAILED DESCRIPTION OF THE PREFERRED EMBODIMENT

Figure 1:
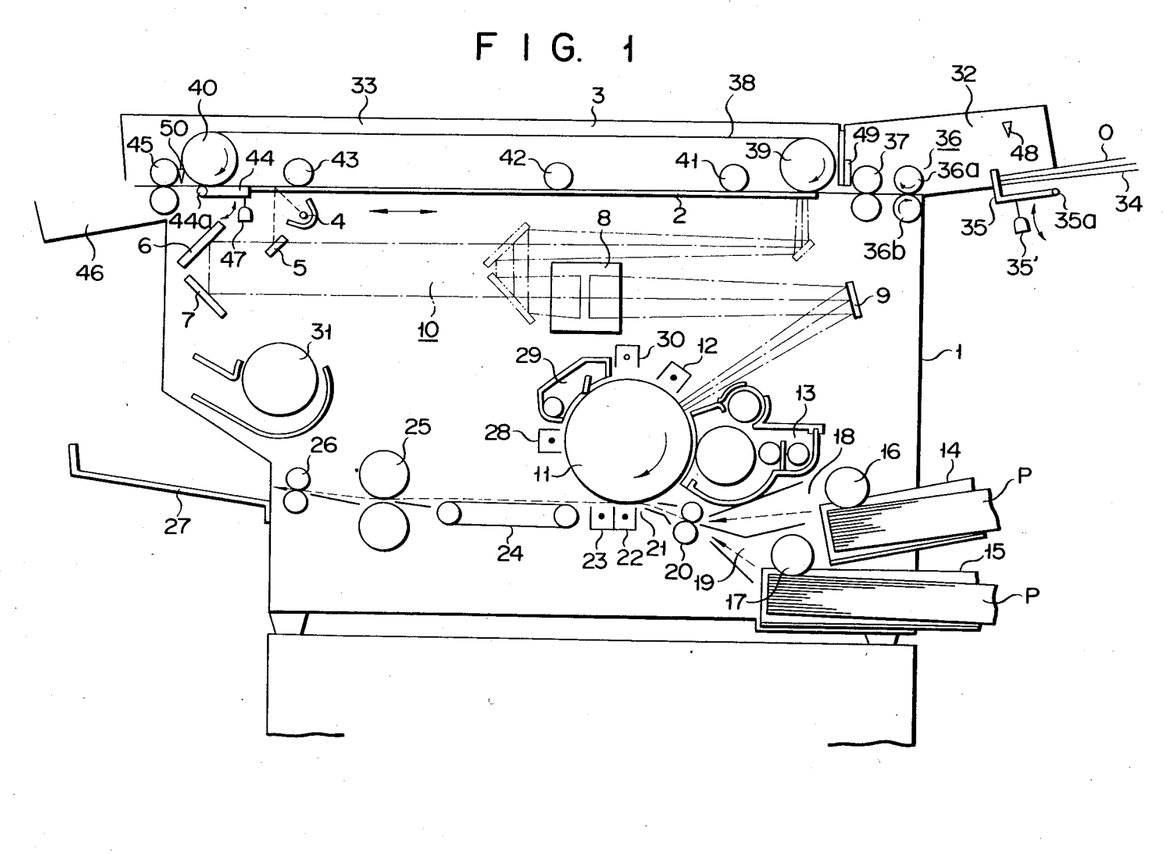
FIG. 1 is a rough sketch of a copying machine provided with an embodiment of a document feeder according to the present invention.

In FIG. 1, a document table (or transparent glass plate) 2 is arranged on top of a copying machine 1, and a document feeder 3 is freely and swingably arranged on the document table 2. Also arranged under the document table 2 is an exposure unit 10 comprising an exposure lamp 4 and mirrors 5, 6, 7 which are reciprocated in the directions of the arrows, and a lens block 8 and a mirror 9 which can move in the direction of optical axis. A document on the document table 2 is scanned by the exposure unit 10 to image a document pattern on the surface of a photoconductive drum 11, which is rotated in the direction of an arrow and charged by a charger unit 12. The charged drum 11 is so exposed by the exposure unit 10 as to form a latent image, which image is developed into a toner image by a developer unit 13.

On the other hand, papers P are picked up, one by one, from an upper or lower paper supply cassette 14 or 15, by means of a feeding roller 16 or 17; guided to a pair of resist rollers 20, through a paper guide path 18 or 19; and sent to an image transferring section 21 by the pair of resist rollers 20.

Each of the paper supply cassettes 14, 15 is freely and detachably attached to the lower right side end portion of the copying machine 1, and either of them can be selected at an operation panel (not shown). The paper P sent to the image transferring section 21 is brought into close contact with the surface of the photoconductive drum 11 at a transfer charger unit 22; and the toner image on the photoconductive drum 11 is transferred to the paper P by the action of the charger unit 22. The paper P to which the toner image has been transferred is peeled off of the photoconductive drum 11 by the action of a peeling charger unit 23, and is then sent to a pair of fusing rollers 25, via a paper conveying path 24. The toner image is fused to the paper P, through the pair of fusing rollers 25.

The image-fused paper P is discharged by a pair of paper discharging rollers 26, to a tray 27 attached to the lower left side end portion of the copying machine 1. The photoconductive drum 11 is electrically erased by an erasing charger unit 28, cleaned by a cleaner 29 to remove residual toner from the surface thereof, and subjected to a fluorescent lamp 30 to erase any residual image thereon. A fan 31 serves to prevent temperature rise in the copying machine 1.

The document or original feeder 3 comprises a feeding section 32 and a transporting section 33. The feeding section 32 includes a tray 34 on which documents D are stacked, a stopper for temporarily holding the documents D, a pair of picking-up rollers 36, and a pair of resist rollers 37. The tray is slanted about 30°, enabling the documents D to slide down to the paired rollers 36 by their own weight. The stopper 35 can swing around its fulcrum 35a in the directions of the arrows; and, when the stopper 35 retreats under the tray 34, the documents D are released from their temporarily-held state. The stopper 35 repeats its swinging motion periodically, even after the release of the document D, to vibrate the documents D from the underside and ease the pick-up of the document D. The feeding roller pair 36 consists of rollers 36a, 36b which are rotated in opposite directions, to enable the documents D to be fed one by one. The resist roller pair 37 serves to feed the picked-up document D to the transporting section 33 in a timely manner, as well as to correct the skew of the document D.

The transporting section 33 includes rollers 39, 40 around which a conveying belt 38 is stretched, rollers 41, 42, 43 which serve to press the belt 38 onto the document table 2, a stopper 44, discharging rollers 45 and a tray 46.

The stopper 44 can swing around its fulcrum 44a in the directions of the arrows, and usually holds the foremost end of the document D in a state such as that illustrated in FIG. 1. When the stopper 44 is swung downward by a solenoid 47, the document D is released.

The document feeder 3 is further provided with plural detectors 48, 49, 50. Detector 48 detects the presence of the document D on the tray 34, detector 49 detects the document D to be reliably fed to the transporting section 33, and detector 50 detects the document D to be discharged.

The documents D are stacked on the tray 34. Following the copy starting operation, the solenoid 47 is actuated, causing the stopper 44 to recede below the original table 2; while the belt 38 starts running to discharge any documents which may be left on the document table 2.

At the same time, a solenoid 35' is actuated, causing the stopper 35 to recede below the tray 34, thereby allowing the documents D to slide down to the pair of rollers 36. The documents D are fed to the resist rollers 37 through a pair of rollers 36. The resist rollers 37 are stopped for a certain time period in this case, during which the document D is fed to the resist rollers 37 through the paired feeding rollers 36 and then corrected about their skew at the foremost ends thereof. When the resist rollers 37 start to rotate, a document D is fed into the transporting section 33.

The pair of feeding rollers 36 are stopped and the stopper 44 is returned to stop the document D at the time the resist rollers 37 start rotating. The roller 36a rotates in the document feeding direction, and the roller 36b rotates in a direction opposite to that of the roller 36a, so that separation of the documents D can be achieved one by one by friction force caused between the rollers 36a and 36b. The document D is conveyed by the belt 38 until its foremost end is brought into contact with the stopper 44. Thus, a copying operation is achieved by the copying machine 1, based on the document D.

After the copying operation, the solenoid is activated, causing the stopper 44 to retreat; while the belt 38 is run to discharge the document D from the original table 2. The document D is discharged into the tray 46, via the rollers 45.

During this original discharging process, the document feeding operation of the feeding rollers 36 is repeated, if the presence of the documents D on the tray 34 is detected by the detector 48. When the discharge of the document D is detected by the detector 50, the stopper 44 is returned to stop the next document.

Upon bringing the foremost end of the document into contact with the stopper 44, the belt 38 is caused to continue its running for a certain distance, starting from when the foremost end of the document D is brought into contact with the stopper 44, thereby correcting the position of the original.

Figure 2:
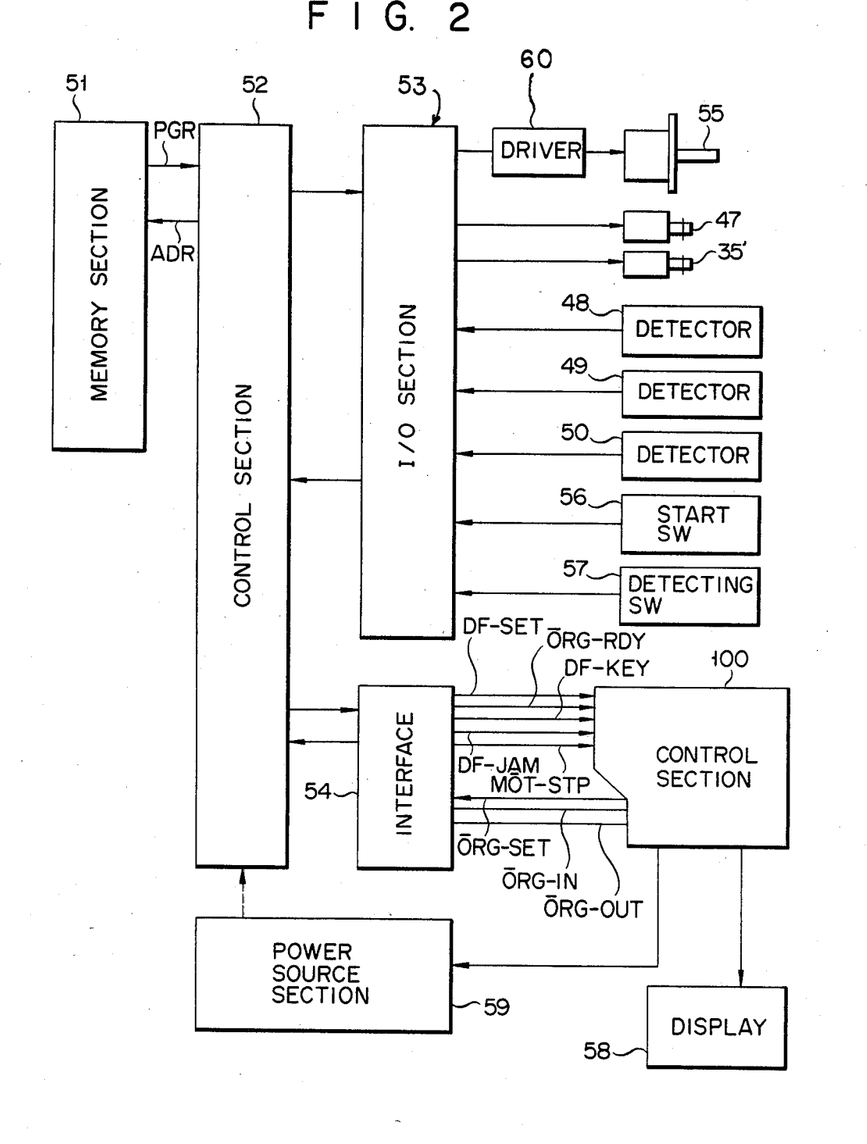
FIG. 2 is a block diagram showing a circuit of the document feeder shown in FIG. 1.

The document feeder has the circuit arrangement shown in FIG. 2. More specifically, it is provided with a memory section 51 for storing the operation program needed to perform each of the operations; and a control section 52 for successively reading out the program stored in the memory section 51 to generate the required control signals. A read only memory in which a control program is stored is used as the memory section 51, and a microcomputer serves as the control section 52. An address signal ADR for specifying the program stored in the memory section 51 is generated from the control section 52; and data PGR on the program which corresponds to the signal ADR is applied to the control section 52, which applies a control signal corresponding to the signal ADR to an input/output section 53 and an interface section 54. Connected to the input/output section 53, are the solenoid 47, detectors 48, 49, 50, a motor 55, a start switch 56 and a switch 57 for determining whether or not the document feeder has been set. The motor 55 is of the brushless type which can rotate positive and negative directions; and the forward or reverse rotation of the motor 55 is used to rotate the stopper 35, paired feeding rollers 36, resist rollers 37, belt 38 and rollers 45. The control section 52 judges the transfer distance of the document D from the amount of rotation of the motor 55, in response to a rotation detecting signal supplied from an OR circuit 98 (FIG. 10) of a motor drive circuit 60 (which will be described later), and drives the motor 55 through the motor drive means 60, according to this judgement. More specifically, the motor drive means 60 drives the motor 55, in response to a signal for designating the rotating direction of the motor 55 and a signal for controlling the rotation of the motor 55.

A start switch 56 serves to start the copying operation, instead of a copy button (not shown) arranged on the copying machine 1. Another switch 57 serves to detect whether or not the document feeder 3 is closed with its belt 38 set on the document table 2.

Therefore, the signal for designating the rotating direction of the motor 55, the signal for stopping or driving the motor 55, and the signal for designating the on-off state of the solenoid 47 are supplied from the control section 52, through the input/output section 53. Conversely, detection signals for the document D are applied from the detectors 48 to 50; a start signal, from the switch 56; and a document feeder set signal, from the control section 52, to the control section 52 through the input/output section 53, respectively.

On the other hand, a document feeder set signal DF-SET, document set signal DOC-RDY, start signal DF-KEY, jam signal DF-JAM and motor stop signal MOT-STP are supplied, from the control section 52, to another control section (or microcomputer) 100 in the copying machine 1, through the interface section 54. The control section 100 of the copying machine 1 is similar to the one which is normally used in controlling copying machines.

Signal DF-SET is supplied as long as the switch 57 is detecting that the document feeder 3 is being held in an operative state, thereby causing the control section 100 of the copying machine 1 to select a program for performing a control sequence in which the document feeder 3 is included.

Signal DOC-RGY indicates that the presence of the documents D on the tray 34 is being detected by the detector 48; and, when this signal is supplied to the control section 100 of the copying machine 1, the copying machine 1 carries out its copying operation in relation to the document D in the document feeder 3.

Start signal DF-KEY indicates that the start switch 56 has been actuated to start the copying operation. Jam signal DF-JAM is supplied when a jam is caused in the document feeder 3, such as in the case wherein no document is detected by the detector 49 for a certain period of time, starting from the start of rotation of the paired feeding rollers 36. This signal DF-JAM is supplied from the control section 52, when the control section 52 judges that a jam has occurred after receiving detection signals from each of the detectors 49, 50.

Signal MOT-STP indicates the operating state of the document feeder 3 serving to start the copying operation of the copying machine 1.

On the other hand, a document set signal DOC-SET, an document insertion signal DOC-IN and a document discharge signal DOC-OUT are supplied from the document feeder 3 to the control section 52 of the document feeder 3, through the interface section 54.

Signal DOC-SET is intended to feed the documents on the tray 34 to the paired feeding rollers 36, while discharging a document on the document table 2. Signal DOC-IN is intended to successively actuate the paired feeding rollers 36, resist rollers 37 and belt 38 so as to feed another document on the document table 2 while discharge the preceding document still left on the document table 2.

Signal DOC-OUT is intended to discharge the original left on the document table 2 into the tray 46.

The timings at which these signals are applied are as follows:

Signal DOC-SET is supplied to cause the stopper 35 to retreat, to feed the documents D to the paired feeding rollers 36. Providing that signal DOC-RDY is present, signal DOC-IN is supplied every time when the document is changed to another one, thereby enabling each of the documents to be set on the document table 2. When no signal DOC-RDY is present (or when no document is detected by the detector 48), signal DOC-OUT is supplied, to discharge the document D.

When no signal DF-SET is present, signal DF-JAM is supplied; and, if any abnormal matter is present in the copying machine 1, the copying operation is stopped. When the cause of this stoppage is eliminated, assuming a predetermined number of copies have not yet been made, signal DOC-SET is supplied; and, thereafter signal DOC-IN is repeatedly supplied.

Figure 3:
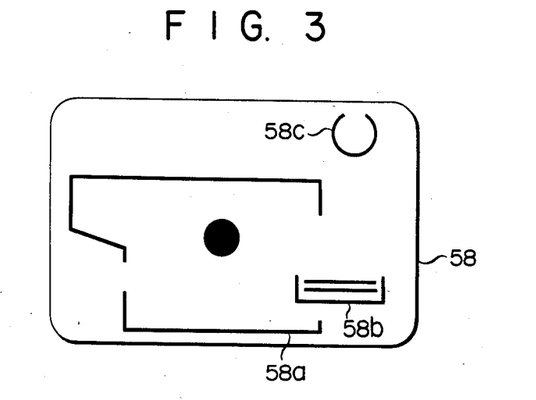
FIGS. 3 and 4 show faces of a display.
Figure 4:
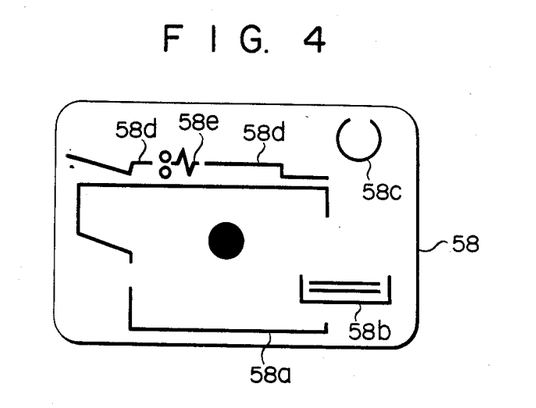

The copying machine 1 is provided with a display section 58 which displays illustrations showing various kinds of operating states. As shown in FIGS. 3 and 4, a liquid crystal display panel is used for the display section 58. This display section 58 has, as its display segments, a symbol 58a for showing the outline of the copying machine 1, symbol 58b for showing the paper supply cassettes 14 and 15, symbol 58c for showing that the copying machine 1 can operate, symbol 58d for showing that the document feeder 3 is set, and symbol 58e for showing that a jam is caused in the document feeder 3. The symbol 58d is displayed when the document feeder 3 is set on the document table 2. The symbol 58e is displayed in response to signal DF-JAM.

A power source section 59 receives its current supply from the copying machine 1, to supply required voltages to the memory section 51, control section 52, input/output section 53, interface section 54, motor 55 and solenoid 47, respectively.

Figure 5:
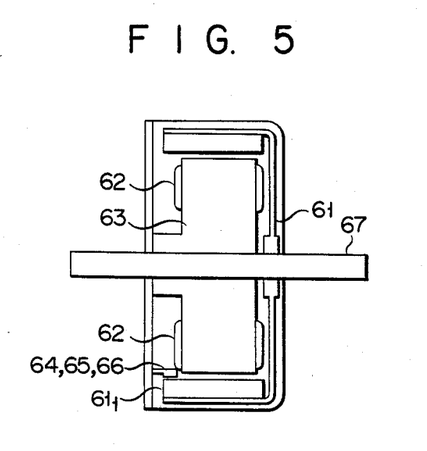
FIG. 5 is a side view showing the arrangement of a brushless motor.
Figure 6:
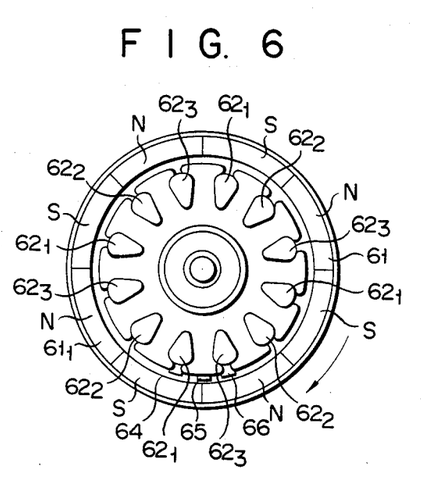
FIG. 6 is a front view showing the arrangement of the brushless motor of FIG. 5.
Figure 7:
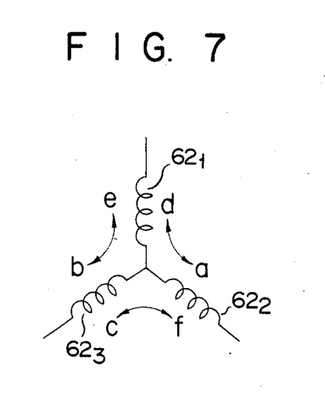
FIG. 7 shows windings of the brushless motor, which windings are connected to one another.
Figure 8:
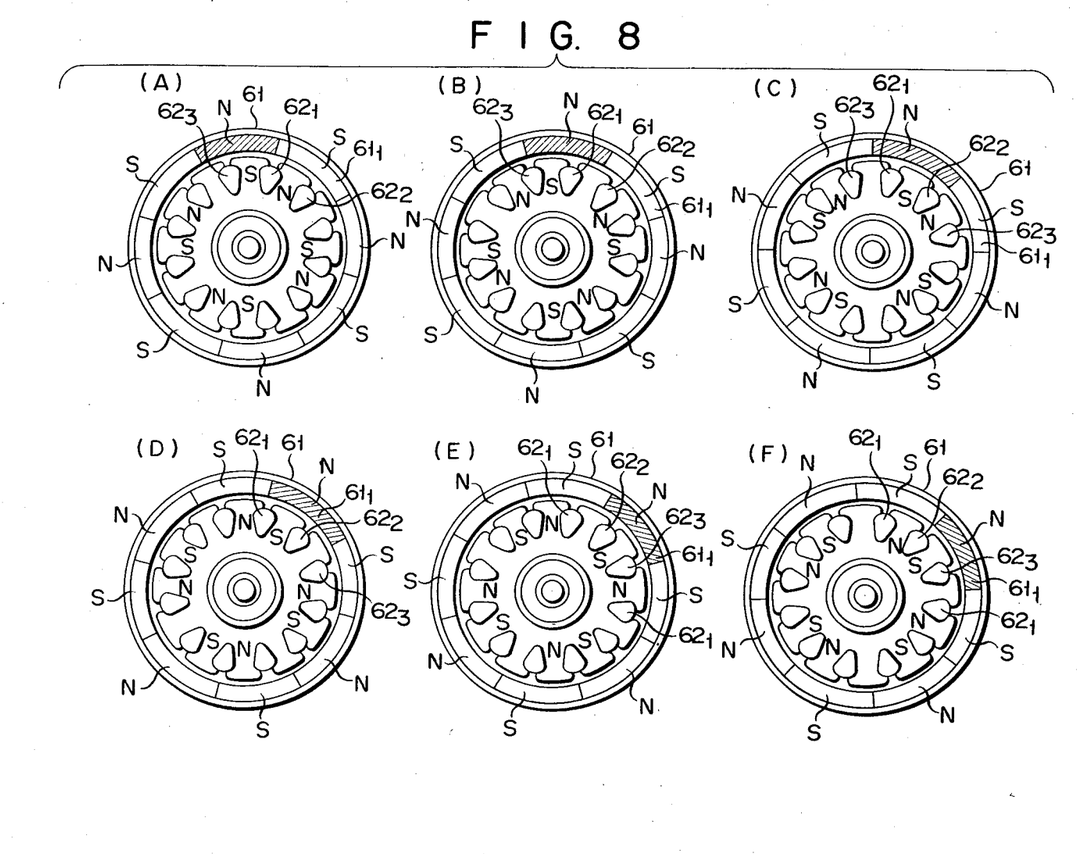
FIG. 8 shows the brushless motor in an excited state.

The motor 55 is a brushless one, such as that shown in FIGS. 5 and 6. In such a brushless motor, a permanet magnet $61_1$, which is so magnetized as to have eight poles, is arranged around the circumference of a rotor 61. A shaft 67 is secured to the rotor 61 and rotates integrally with respect to the rotor 61. Phase windings $62_1$, $62_2$ and $62_3$ are inserted into twelve slots of a stator 63, respectively, and one set of phase windings $62_1$, $62_2$ and $62_3$ are star-connected to one another at one of their ends and on their interiors, as shown in FIG. 7. Since the phase windings $62_1$, $62_2$ and $62_3$ are star-connected with one another as described above, they are excited every two-phases, to form the six combinations denoted a to f. The excitation pole is successively shifted every one slot, due to these six combinations of excited phases. More specifically, when the windings are excited in the order of (A), (B), (C), (D), (E) and (F), as shown in FIG. 8, the rotor 61 rotates a half slot at one step and 90° at one process to (A) to (F) in the clockwise direction due to the interaction between magnetic fields of the windings $62_1$, $62_2$ and $62_3$ and of the permanent magnet $61_1$. When the windings are conversely excited in the order designated (F) to (A), as shown in FIG. 8, the rotor 61 rotates in a counterclockwise direction.

Figure 9:
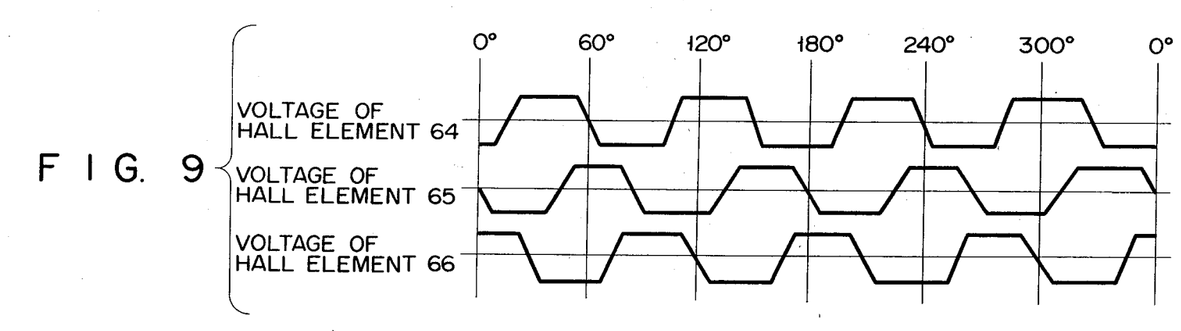
FIG. 9 shows the voltage waveforms of Hall elements arranged within the brushless motor.

The stator 63 includes three Hall elements (or position detectors) 64, 65, 66 arranged at an interval of a half slot and adjacent to the rotor 61. The Hall elements 64, 65, 66 generate AC voltages (or Hall voltages) whose phases are shifted by ⅓ of a cycle from one another, as shown in FIG. 9, when the rotor 61 rotates in a clockwise direction. When the Hall elements 64, 65 and 66 have generated Hall voltages of four cycles, the rotor 61 finished one rotation. Specifically, the Hall voltage of one cycle corresponds to a 90° rotation of the rotor 61. The rotor 61 is rotated by changing, in response to the Hall voltages, the direction in which the windings $62_1$, $62_2$, $62_3$ are excited. When the rotor 61 is to be rotated in a clockwise direction, it is in the position shown in (F) of FIG. 8, providing that the Hall voltages of the Hall elements 64, 65, 66 are minus, zero and plus, respectively. When the excited phases are-exchanged in direction (a), as shown in FIG. 7, the rotor 61 is rotated 15° in the clockwise direction and tends to stay at the position shown in (A) of FIG. 8. When the rotor 61 reaches this position, however, the Hall voltages of the Hall elements 64, 65, 66 are changed to zero, minus and plus; the excited phases are exchanged in direction (b), as shown in FIG. 7; and the rotor 61 is rotated 15°, to move to the position shown in (B) of FIG. 8. The rotor 61 is rotated in the clockwise direction when the excited phases are successively exchanged in this manner, in response to the Hall voltages.

Figure 10:
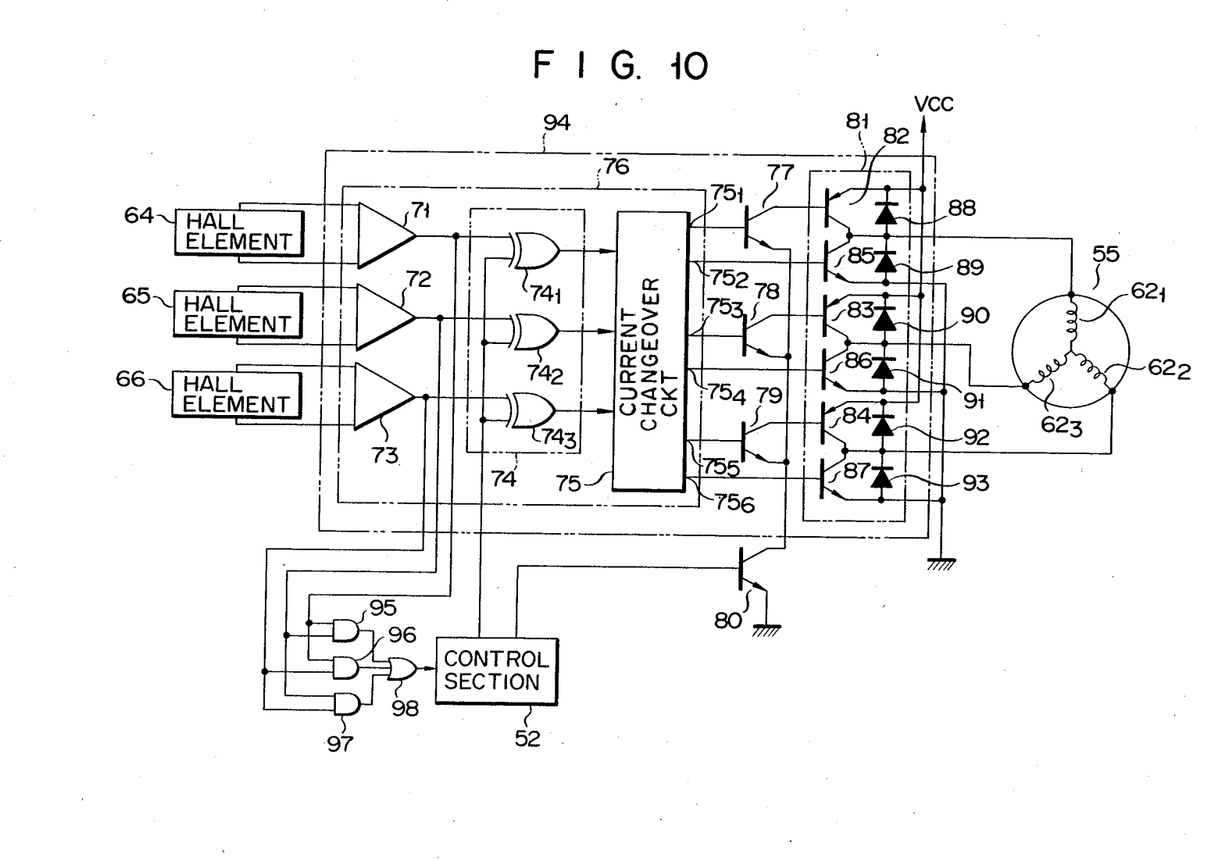
FIG. 10 is a circuit diagram of a motor drive circuit.

The motor drive circuit 60 has the arrangement shown in FIG. 10. More specifically, signals are supplied from Hall elements 64, 65 and 66 to comparators 71, 72 and 73, respectively, which serve to wave-shape the supplied signals. Outputs of the comparators 71, 72, 73 are supplied to a rotation changeover circuit 74, which circuit 74 is intended to select the rotating direction of the rotor 61, in response to signals supplied from the control section 52, and which comprises, e.g., exclusive OR circuits (EOR) $74_1$, $74_2$ and $74_3$. Outputs from the rotation changeover circuit 74, i.e., the outputs of EORs $74_1$, $74_2$ and $74_3$, are supplied to a current changeover circuit 75, which circuit 75 supplies excited-phase changeover signals from its output terminals $75_1$ to $75_6$, in response to outputs from the rotation changeover circuit 74, said excited-phase changeover signals being as shown in Table 1. The comparators 71, 72, 73, rotation changeover circuit 74 and circuit changeover circuit 75 form an inverter control section 76.

TABLE 1

| Output of EOR74$_1$ | Output of EOR74$_2$ | Output of EOT74$_3$ | Output Terminal 75$_1$ | Output Terminal 75$_2$ | Output Terminal 75$_3$ | Output Terminal 75$_4$ | Output Terminal 75$_5$ | Output Terminal 75$_6$ |
|---|---|---|---|---|---|---|---|---|
| 0 | 0 | 1 | 1 | 0 | 0 | 0 | 0 | 1 |
| 0 | 1 | 0 | 0 | 1 | 1 | 0 | 0 | 0 |
| 0 | 1 | 1 | 0 | 0 | 1 | 0 | 0 | 1 |
| 1 | 0 | 0 | 0 | 0 | 0 | 1 | 1 | 0 |
| 1 | 0 | 1 | 1 | 0 | 0 | 1 | 0 | 0 |
| 1 | 1 | 0 | 0 | 1 | 0 | 0 | 1 | 0 |

Outputs are supplied from the output terminals 75$_1$, 75$_3$, 75$_5$ of the current changeover circuit 75 to switching elements or bases of NPN type transistors 77, 78 and 79, for example, whose emitters are connected to the collector of an NPN type transistor 80. The transistor 80 is turned on and off in response to signals applied from the control section 52, thereby turning the transistors 77, 78 and 79 on and off. The transistors 77, 78, 79 are switched to determine the lengths of time during which excitation voltages are supplied to the windings 62$_1$, 62$_2$ and 62$_3$, in response to outputs of the current changeover circuit 75. Specifically, transistors 77, 78 and 79 supply changeover signals, in response to excited-phase changeover signals supplied from the current changeover circuit 75, to the transistor 80 which is turned on and off.

Excited-phase changeover signals from the output terminals 75$_2$, 75$_4$, 75$_6$ of the current changeover circuit 75, as well as outputs from the collectors of transistors 77, 78 and 79, are supplied to a transistor inverter (or inverter) 81, which inverter 81 comprises PNP type transistors 82, 83 and 84, NPN type transistors 85, 86 and 87, and diodes 88, 89, 90, 91, 92 and 93. The transistors 82 to 87 are turned on or off in response to the signals supplied thereto, thereby allowing excitation voltages to be applied to the windings 62$_1$, 62$_2$, 62$_3$. The inverter control section 76 is so coordinated with the transistor inverter 81 as to form a transistor inverter section 94. The diodes 88 to 93 are intended to protect the transistors 83 to 87 from back electromotive forces created in the windings 62$_1$, 62$_2$, 62$_3$.

Figure 11:
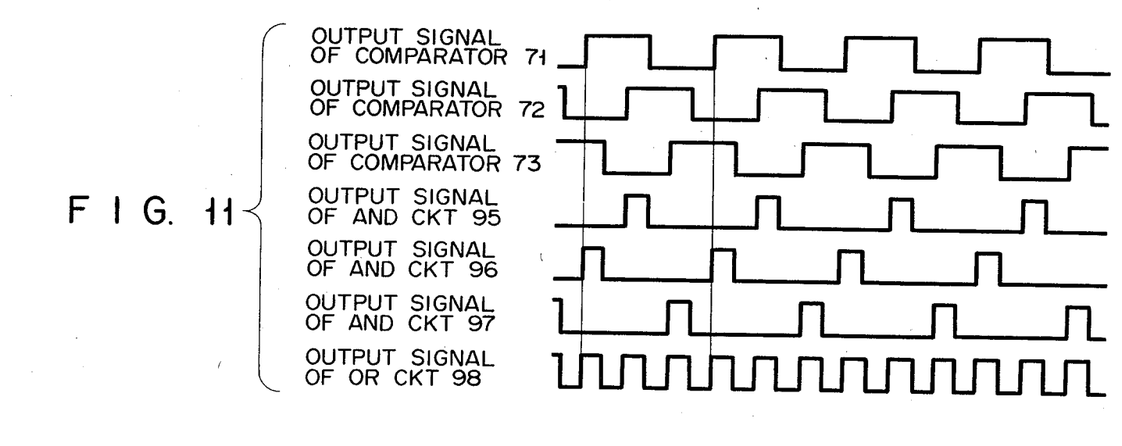
FIG. 11 is a timing chart of signals in the motor drive circuit.
Figure 12:
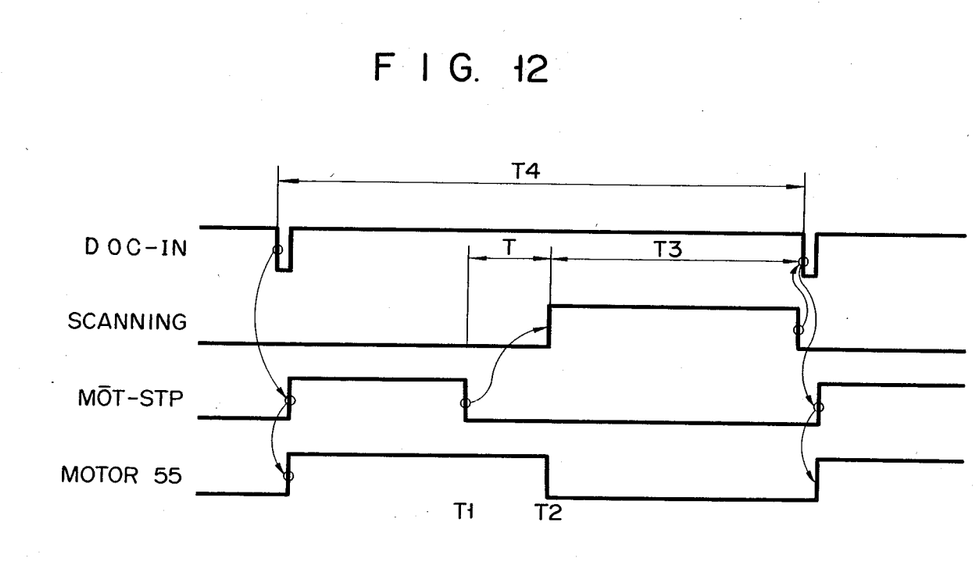
FIG. 12 is an operation timing chart of the document feeder.

The outputs of comparators 71, 72 and 73 are supplied to one of the input terminals of AND circuits 95, 96 and 97; while outputs of comparators 72, 73 and 71 are supplied to the other input terminals of AND circuits 95, 96 and 97. The outputs of AND circuits 95, 96 and 97 are supplied to an OR circuit 98 whose output is supplied, as a rotation detecting signal, to the control section 52. The control section 52 judges the amount of movement of the documents D, counting output pulses of the OR circuit 98. When the motor 55 rotates in the forward direction, for example, the paired feeding rollers are rotated. When the motor 55 rotates in the forward or reverse direction, the paired resist rollers 37 are rotated, the belt 38 is run, the stopper 35 is swung and the rollers 45 are rotated. This reverse rotation of the motor 55 starts in response to signal DOC-IN, as shown in FIG. 12, and the amount of movement of the document is calculated at the time of this reverse rotation. More specifically, when signals which are supplied from the Hall elements 64 to 66 at the time of reverse rotation are applied to the comparators 71, 72, 73, the rectangular signals shown in FIG. 11 are supplied from the comparators 71, 72, 73. When output signals of the comparators 71, 72, 73 are supplied to the gate circuits 95, 96, 97, pulse signals are generated from these AND circuits 95, 96, 97. When pulse signals of the AND circuits 95 to 97 are supplied to an OR circuit 98, the OR circuit 98 generates a pulse signal which is composed of pulse signals from AND circuits 95 to 97. When the pulse signal of the OR circuit 98 is supplied to the control section 52, the control section 52 counts pulses to calculate the amount of movement of the documents from the number of pulses counted. When pulses which correspond to one cycle of Hall voltage are counted in this case, the control section 52 judges that the motor 55 has rotated 90°. Following this rotation of the motor 55, the paired resist rollers 37 are rotated to feed a document D to the document table 2. The belt 38 runs during this time to convey the document D. During this process, the control section 52 continues to count output pulses of the OR circuit 98, thereby calculating the amount of movement of the document D. When any load is added to the belt 38 during this document conveying process, to thereby reduce the speed of the motor, the output frequencies of the Hall elements 64, 65 are dropped. Therefore, the control section 52 calculates the amount of movement of the document D, in response to the speed reduction of the motor 55. When the amount of movement reaches a predetermined level, the control section 52 halts the supply of the signal MOT-STP (time T$_1$). Although the document D has not yet reached the stopper 44 at this time, the pre-copying operation is now begun. Specifically, the exposure lamp 4 is pre-heated and a supply of paper from the paper supply cassette 14 or 15 is started. When the amount of movement reaches that value at which the document D has been conveyed to the stopper 44, the control section 52 stops the motor 55. The exposure unit scans the document D, at this time, and the copying operation is begun. The copying operation is completed after a given period of time T$_3$ has elapsed. When signal DOC-IN is again supplied to the control section 52, the document feeding operation is thereafter repeated.

According to the present invention, as described above, a document feeder is provided, wherein a brushless motor is used as a driving motor, to drive its document feeding mechanism; and wherein a signal, which accurately corresponds to the amount of rotation of the motor, is so detected as to judge the amount of movement of a document. Thus, even when a load in the conveying path of the document feeder causes a change in the rotation of the driving motor, the document will be conveyed to the correct position, without fail.

In the above embodiment, the Hall elements are arranged at intervals of half the width of the slot. The intervals are not limited to this. The elements may be arranged at other invertals, provided they generate a signal having the waveform shown in FIG. 9.

What is claimed is:

1. A document feeder comprising:
   a brushless motor including a stator provided with plural slots into which plural wingings are provided, and a rotor provided with a permanent magnet;

document conveying means which is driven by said brushless motor, to convey documents;

rotation detecting means, disposed on said brushless motor, to generate at least one signal which accurately corresponds to the amount of rotation of said brushless motor;

drive means for driving said brushless motor in response to output signals of said rotation detecting means; and control means for determining the amount of movement of the document from the output signals of said rotation detecting means and determining the stop timing of said brushless motor after said document has been moved a predetermined distance.

2. A document feeder according to claim 1, wherein said rotation detecting means comprises at least one Hall element arranged on said brushless motor.

3. A document feeder according to claim 1, wherein said drive means comprises means for generating at least one excited-phase changeover signal in response to the signal of said rotation detecting means; and transistor inverter means which is turned on and off by the output signal of said excited-phase changeover means, to supply excitation voltages to said phase windings of said brushless motor.

4. A document feeder according to claim 1, wherein said drive means comprises: means for wave-shaping the output signal of the rotation detecting means; first circuit means for supplying output signals of said wave-shaping means, in response to the rotating direction signal from said control means; second circuit means for supplying a predetermined excited-phase changeover signal, in response to the output signal from said first circuit means; and transistor inverter means which is turned on and off by the output signal from second circuit means, to supply excitation voltages to said brushless motor.

5. A document feeder according to claim 4, wherein said first circuit means is an exclusive OR circuit means for receiving the output signal from said wave-shaping means and the phase changeover signal from said control means.

6. A document feeder according to claim 4, wherein said second circuit means includes means for supplying the said predetermined phase changeover signal, in response to the output signal from said first circuit means.

7. A document feeder according to claim 4, wherein said transistor inverter means comprises a plurality of transistor circuits sequentially connected to said phase windings; and wherein each of said transistor circuits comprises a pair of transistors having collectors connected to one of said phase windings, and which are turned on and off by output signals from said second circuit means.

8. A document feeder according to claim 4, wherein said transistor inverter means is turned off by a stop signal from said control means.

9. A document feeder according to claim 1, wherein said rotation detecting means comprises means for generating a pulse signal corresponding to the amount of rotation of the brushless motor; and wherein said control means counts the pulses of the pulse signal, to stop the brushless motor when the value of pulses counted reaches a predetermined count.

10. A document feeder according to claim 1, wherein said rotation detecting means comprises a plurality of Hall elements arranged on the brushless motor, to generate pulse signals according to the amount of rotation of said motor; and wherein said control means comprises gating means for AND gating every two-output-signals of the Hall elements, and means for counting output pulses of said gating means.

* * * * *